United States Patent
Gopalakrishnan et al.

(10) Patent No.: US 6,836,666 B2
(45) Date of Patent: Dec. 28, 2004

(54) METHOD TO CONTROL UPLINK TRANSMISSIONS IN A WIRELESS COMMUNICATION SYSTEM

(75) Inventors: Nandu Gopalakrishnan, Chatham, NJ (US); Srinivas R. Kadaba, Chatham, NJ (US); Ashok N. Rudrapatna, Basking Ridge, NJ (US); Ganapathy Subramanian Sundaram, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 552 days.

(21) Appl. No.: 09/851,100

(22) Filed: May 8, 2001

(65) Prior Publication Data

US 2002/0183064 A1 Dec. 5, 2002

(51) Int. Cl.[7] .................................................. H04Q 7/20
(52) U.S. Cl. ................................ 455/452.2; 455/452.2; 455/450; 455/522
(58) Field of Search ......................... 455/522, 69, 70, 455/442, 455, 432.3, 452.2, 450; 370/348, 335, 449, 465, 395, 479; 709/326

(56) References Cited

U.S. PATENT DOCUMENTS

| | | | | |
|---|---|---|---|---|
| 6,069,883 | A | | 5/2000 | Ejzak et al. ................ 370/335 |
| 6,285,665 | B1 | * | 9/2001 | Chuah ........................ 370/319 |
| 6,285,886 | B1 | * | 9/2001 | Kamel et al. ............... 455/522 |
| 6,310,869 | B1 | * | 10/2001 | Holtzman et al. .......... 370/335 |
| 6,415,149 | B1 | * | 7/2002 | Bevan et al. ............... 455/442 |
| 6,498,785 | B1 | * | 12/2002 | Derryberry et al. ........ 370/311 |
| 6,567,482 | B1 | * | 5/2003 | Popovic' .................... 375/343 |
| 6,577,875 | B1 | * | 6/2003 | Brouwer ..................... 455/522 |
| 6,671,266 | B1 | * | 12/2003 | Moon et al. ................ 370/342 |
| 2001/0005359 | A1 | * | 6/2001 | Bergqvist ................... 370/230 |
| 2002/0086692 | A1 | * | 7/2002 | Chheda et al. ............. 455/522 |
| 2003/0013451 | A1 | * | 1/2003 | Walton ....................... 455/447 |

FOREIGN PATENT DOCUMENTS

| | | | |
|---|---|---|---|
| EP | 0 887 948 A2 | 12/1998 | ........... H04B/7/005 |
| WO | WO 99/14975 | 3/1999 | ............ H04Q/7/38 |

OTHER PUBLICATIONS

Distributed–Queueing Request Update Multiple Access (DQRUMA) for Wireless Packet (ATM) Networks, by M. J. Karol, Z. Liu, and K. Y. Eng, in *Proc. Intl. Conference on Communications*, pp. 1224–1231, Jun. 1995.
"Error Control Coding: Fundamentals and Applications," by S. Lin and D. J. Costello, Prentice Hall, 1983, pp. 477–481.
Error Control Systems for Digital Communication and Storage, by S. B. Wicker, Prentice Hall, 1995, pp. 409–422.

* cited by examiner

*Primary Examiner*—David Hudspeth
*Assistant Examiner*—Julio Perez
(74) *Attorney, Agent, or Firm*—Christopher N. Malvone; Stephen M. Gurey

(57) ABSTRACT

Efficient data communication in wireless communication system is provided by using centralized control of data communications, such as packet switched services, over the uplink channel (mobile station (MS) to base station (BS)). A multiple access protocol is used where packet data mobile stations make requests for uplink channel resources. The request messages transmitted by the MSs inform the BS of service parameters. Examples of such service parameters are available transmit power at the MS, the amount of data to transmit and Quality of Service (QoS). The BS then processes the received request messages and performs interference management calculations to determine the portion of the BS's receive power budget that can be allocated to the data user requesting service. These calculations are used to control the amount of interference seen at the base station, to assign a data rate to the user and to aid scheduling algorithms in computing service order priorities. Any scheduling algorithm may be used; for example, scheduling may be based on the amount of data to be transmitted, the age of the data or the service priority associated with the mobile station. The interference control is used to prevent the occurrence of catastrophic levels of interference while maximizing the utilization of resources on the uplink.

9 Claims, 1 Drawing Sheet

METHOD TO CONTROL UPLINK TRANSMISSIONS IN A WIRELESS COMMUNICATION SYSTEM

BACKGROUND OF THE INVENTION

1. Field of the Invention

The present invention relates to communications; more specifically, wireless communications.

2. Description of the Related Art

Previously, resource management and channel allocation on the uplink or reverse link (RL) has been treated primarily as a "distributed control" problem. In other words, a Base Station (BS) did not control the operations by assigning service order priorities. However, the BS did supervise access to the reverse link and monitor operations via slow or fast power control. For example, in CDMA 2000-1x systems, each mobile requested a reverse link channel at a specific rate. The BS monitored the interference patterns and determined whether to admit the user or not. Once the user was admitted at a chosen rate, the BS monitored the subsequent transmissions via fast power control. Another example of reverse link access and control can be found in 1xEV-DO systems. In these systems, every mobile began to transmit autonomously beginning with the lowest rate in the rate set. At every subsequent transmission, each mobile autonomously doubled its data rate. The base station continued to monitor the channel via power control. If the aggregate received power at the BS or the interference to each user exceeds a predefined threshold, the BS ordered all mobiles to reduce their data rates. Due to the autonomous nature of the transactions, this resulted in an inefficient data communications on the uplink between mobile stations and base stations.

SUMMARY OF THE INVENTION

One embodiment of the present invention provides efficient data communication in wireless communication systems by providing centralized control of data communications, such as packet switched services, over the uplink channel (mobile station (MS) to base station (BS)). A multiple access protocol is used where packet data mobile stations make requests for uplink channel resources. The request messages transmitted by the MSs inform the BS of service parameters. Examples of such service parameters are available transmit power at the MS, the amount of data to transmit and Quality of Service (QoS). The BS then processes the received request messages and performs interference management calculations to determine the portion of the BS's receive power budget that can be allocated to the data user requesting service. These calculations are used to control the amount of interference seen at the base station, to assign a data rate to the user and to aid scheduling algorithms in computing service order priorities. Any scheduling algorithm may be used; for example, scheduling may be based on the amount of data to be transmitted, the age of the data or the service priority associated with the mobile station. The interference control is used to prevent the occurrence of catastrophic levels of interference while maximizing the utilization of resources on the uplink.

This method is useful in wireless communication systems such as Code Division Multiple Access (CDMA) systems, which serve a mixture of traffic classes; for example, voice services and data services. The method is particularly useful with respect to the packet data component of the overall traffic and serves to efficiently utilize the uplink channel while striking a balance between minimizing aggregate channel interference and improving user level quality of service (QoS).

DETAILED DESCRIPTION

Figure 1:
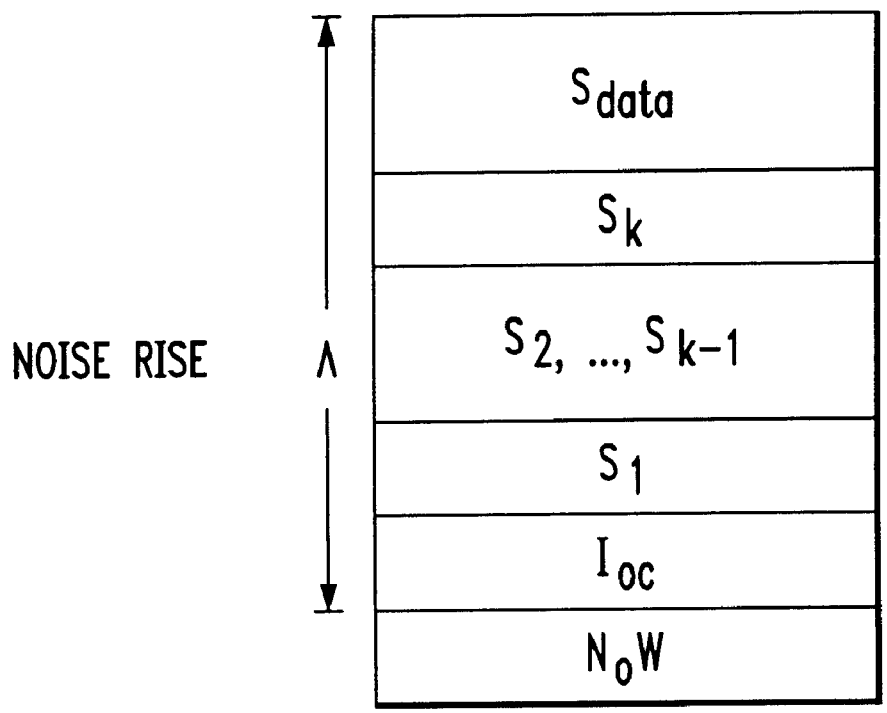
FIG. 1 illustrates a receive power or interference power budget at a base station.

The centralized protocol and interference management scheme strikes a balance between network throughput and user level QoS. This is achieved via a combination of fast rate adaptation (and some power control if necessary), and centralized scheduling at the BS. In addition to enabling fast scheduling, this mechanism enables the use of advanced techniques such as hybrid ARQ and various flavors of incremental redundancy. These techniques are applicable when fast rate adaption is used (as opposed to conventional power control) and are aimed at improving network and user performance.

The multiple access protocol used is a modification of the DQRUMA protocol described in "Distributed-Queueing Request Update Multiple Access (DQRUMA) for Wireless Packet (ATM) Networks," by M. J. Karol, Z. Liu, and K. Y. Eng, in *Proc. Intl. Conference on Communications*, pp. 1224–1231, June 1995, and is optimized for packet data systems using CDMA in the reverse link. The interference management scheme has several options. One option relates to relatively slow scheduling by averaging across various measurements (in the reverse link) in order to optimize purely for user level satisfaction. The averaging eliminates or reduces any channel variations and renders the effective channel somewhat static. Another option relates to fast scheduling by tracking and exploiting channel variations to improve throughput and reduce interference. A combination of these options can also be performed. Moreover, each component is applicable independent of the other components. For example, the protocol is applicable with any interference management scheme and any scheduling scheme.

In CDMA systems, the reverse link consists of users transmitting individually with little or no synchrony between users. Data from a user can be classified into three broad categories: control and signaling information (such as power control bits, channel quality information, etc.), protocol information (for example, access reservation requests), and actual data traffic relevant to the service. These (and possibly more) classes of data, are usually spread using separate Walsh codes. For example, the first Walsh code may be designated for signaling, the second for protocol information, and the third and fourth for voice and data services, respectively. These spread messages are then combined and further spread using the user-specific long code. The initial Walsh spreading is done to enable the BS to differentiate between the categories of data, and the subsequent long code spreading is done to differentiate between users.

For instance, Walsh code 2 could be used for making requests for channels to transmit in the uplink. If the reservation is accepted and a reverse link transmission is scheduled, then data is sent along Walsh code 4. During a given transmission, any combination of these Walsh codes could be used thereby enabling the mobiles to send control information, as well as make reservations, along with traffic channel data (all of them simultaneously). The set of Walsh codes that will be used in any given system will be fixed across users. The user long codes will be generated as in current CDMA systems such as IS-95, IS-2000, or UTRAN. These long codes are applied on top of the Walsh coded streams and help distinguish one user's signal from another. Due to the use of user-specific long codes, the same set of Walsh codes can be used by every user to spread different data streams.

An example of the control channels (including bit budgets) required is outlined in the following. These channels can be sent over separate Walsh codes or can be time-multiplexed onto a single code. This structure could be used to implement the protocol described in the following section.

The Reverse Pilot Reference Channel

This channel carries the transmit power used for the mobile station's Reverse Pilot Channel. It consists of a 6-bit field transmitted once every 10 ms, and aids the base station in making scheduling decisions.

The Reverse Request/Update Channel

This channel is used by the mobile station to make new or updated scheduling requests to the base station. This 6-bit field indicates the size of traffic data to be transmitted (expressed as number of 768-bit packets), and is transmitted once every 10 ms.

The Reverse Rate Indicator Channel

This channel is used by the mobile station to indicate the data rate on the Reverse Packet Data Channel. This 4-bit field is sent in a single slot, every packet. If the base station and the mobile station are not implicitly aware of the information block size to be used on the data traffic channel, then additional bits can be added to carry this information.

The Reverse Hybrid ARQ Control Channel

This channel carries control information to aid in the Hybrid ARQ operation at the base station receiver. Hybrid ARQ is well known and is disclosed in publications as "Error Control Coding: Fundamentals and Applications," by S. Lin and D. J. Costello, Prentice Hall, 1983, pages 477–481 and "Error Control Systems for Digital Communication and Storage, by S. B. Wicker, Prentice Hall, 1995, pages 409–422.

The Forward Schedule Grant Channel

This channel communicates a reverse link transmit start time to one or more mobiles. This channel may be a common channel or overhead channel that identifies a particular mobile for message reception, or it may be a mobile specific channel communicating a message such as a one bit message. Messages on this channel may also be used to communicate reverse link data rate and/or transmit levels. In addition, this channel may also carry messages indicating amounts of data to transmit on the reverse link and/or a reverse link transmit stop time.

The Forward Link Hybrid and ACK/NACK Channel

This channel communicates ACK or NACK bits to one or more mobile stations to support the Hybrid ARQ operation. This channel may be a common channel or mobile specific channel.

FIG. 1 illustrates a receive power budget for an uplink channel; however, in CDMA type systems this can be thought of as a "total" noise or interference budget. A portion of the budget shown as $N_0W$ is the total background or thermal noise in the bandwidth W. The value $\Lambda$ is the total amount of received power that the receiver can accept. The value $\Lambda$ is typically defined such that $\Lambda/N_0W=3-6$ dB. $I_{OC}$ refers to the interference received from other base stations or sectors. Values $S_1$ through $S_n$ refer to the amount of power received at the base station from all power controlled channels and voice users 1 through n. $S_{data}$ refers to the remaining received power available to other users such as data users.

In CDMA type systems, for each user's signal received by the base station all of the other users' signals appear as noise. For example, if there are no data users, the total noise received at the base station with respect to user signal $S_2$ is the sum of $N_0W$, $I_{OC}$, user signal $S_1$ and user signals $S_3$ through $S_k$. CDMA systems use power control for each of the users to limit the received signal power so that it satisfies an acceptable error rate while minimizing the power received by the base station so as to minimize the noise with respect to other user signals.

$S_{data}$ represents the available receive power or interference that may be received as a result of another user, such as a data user, without causing unacceptable error rates in other user signals received at the base station. Adding a data user will increase the overall noise and will require an increase in the signal power received at the base station from each user $S_i$ in order to maintain acceptable error rates for each user. This increase may be executed prior to allowing the data user to transmit to avoid any disruption in transmissions received from users $S_i$. As a result, the portion of the interference or receive power $S_{data}$ available for a data user is slightly decreased by the increased budget provided to each of the users $S_i$.

The data user is instructed to transmit data over the uplink at a standard rate that will be received at the base station with the power level of $S_{data}$ or less. It should be noted the rate may be limited by the channel conditions between the base station and data user and the amount of transmit power that the user has available.

Each data user is scheduled so that only one data user at a time is using the $S_{data}$ receive power budget; however, $S_{data}$ may be divided into portions assigned to different data users so that the different data users may transmit simultaneously.

Data users are scheduled to transmit based on parameters such as the quality of service or priority purchased by the user, the amount of data to be transmitted, the time since the last transmission and the time criticality of the data to be transmitted. Generally speaking, scheduling should be scheduled so that the users are treated fairly, interference to other cells or sectors is minimized and the utilization of received data budget $S_{data}$ is maximized.

The resource management protocol works as follows.

1. Mobile stations request for RL traffic channel. This request consists of size of traffic data to be transmitted (quantized in bytes for example), information about mobile capabilities related to its power class, some auxiliary information related to the transmission, and QoS parameters or requirements such as delay or throughput bounds.

2. The BS stores the above information and measures channel conditions. It computes the maximum receivable power on the packet data channel and the corresponding data rate. A method to measure channel conditions and compute the data rate, based on interference issues, is discussed below.

3. The BS computes a schedule based on the information it has received from all users and the information it has processed. The protocol supports the use of a variety of scheduling algorithms. The schedule can be computed at short intervals (e.g. the duration of one power control group) or long intervals (e.g. the duration of multiple frames). The duration between scheduling events depends on the degree of optimization desired; a short duration results in higher optimization but may require higher overheads and processing speeds.

4. The BS may choose to transmit the value of the maximum allowable transmission rate R, or the corresponding receivable power for the high-speed RL packet data channel (denoted by $S_{data}$ (R)). This information can be sent over a forward link channel at an appropriate frequency depending upon the choice of fast or slow scheduling. The computation of $S_{data}$ (R) is based on measurements and some prediction to account for changes in voice activity, and other power controlled services and channels. For any given system, there is a one-to-one correspondence between R and $S_{data}$ (R), as we will discuss later. However, the choice of transmitting R or $S_{data}$ (R) may be based on other considerations such as overheads and power consumption.

5. The BS transmits the identity (or identities) of the user(s) and the corresponding transmit power(s). This information can be sent on the forward link along a common channel or dedicated channel(s). Alternatively, the BS just transmits user identities and the MS's determine the appropriate transmit power level required by using pilot measurements. The details of this technique are explained below.

6. Subsequently the scheduled MS(s) transmits data at a rate allowed by the prescribed transmit power.

7. If the amount of data in the MS's buffer is below a certain threshold (which can be specified and made system dependent), then the mobile station may choose to transmit autonomously without going through the request/scheduling process.

8. Soft handoff (SHO) users are treated more carefully. Since MS's in soft handoff can simultaneously communicate with multiple BS's, more than one base station may schedule the user. Also, not all BS's in the "active set" may schedule the chosen MS. In this case, more than one option exists.

Soft Handoff Options

For mobiles in soft handoff, more than one BS can listen to any RL transmission. These BS's a re called the "active set". In systems such as IS-95 and cdma2000 1x, the uplink pilot and power controlled channels/services follow the OR-of-the-downs rule: if even one BS in the active set commands that the MS decrease its power, then the MS obeys it. Conversely, the MS increases its power if and only if all BS's so command. This is done with a view towards minimizing the interference from SHO users. The same principle can be applied to scheduling: if every BS in the active set schedules a given mobile, then and only then will the mobile transmit. Furthermore, it transmits at the minimum of the power levels (and hence the corresponding data rate) assigned by the BS's in the active set. This is a conservative approach, and hence results in cell shrinkage and lower throughput. Other approaches proposed include scheduling a very low rate channel to every SHO user. This leads to an ad hoc utilization of the channel and interference management. We propose two new solutions:

Option 1. For SHO mobiles (more generally every mobile), strict scheduling deadlines could be maintained for the data services so as to guarantee a minimum QoS at the anchor point where data throughput and delay parameters can be measured. An example of an anchor point is the IWF or the base station controller (BSC). With such a rule, the anchor point instructs all BS's in the active set to schedule a certain MS, if it finds that QoS requirements will be violated. This message is sent over the backhaul to every BS in the active set and overrides scheduling decisions made by the BS's. The MS then transmits at the minimum of all the power levels (and hence data rates) indicated by the BS's in the active set. This allows for "fair" treatment of SHO users and does not suffer from the cell shrinkage problem as earlier. The QoS requirement thresholds can themselves be based on radio link protocol (RLP) timers.

Option 2. SHO users receive scheduling information from individual BS as earlier. If a MS is scheduled by some, but not all, of the BSs in the active set, the MS makes a randomized decision to transmit. This allows for SHO users to transmit sometimes but not always, and in particular does NOT rely on any centralizing of control at the BSC. SHO users will typically pick the transmit power corresponding to the lowest value in order to minimize received interference.

The randomization could be biased based on interference considerations, and can be set or changed during operation.

In general, for hybrid ARQ to work for SHO users, an explicit rate indicator should be used in the RL. Hybrid ARQ for SHO users can be done at two levels—at the BS or at the anchor point. Each BS performs an independent hybrid ARQ operation, which exploits time diversity. On the other hand hybrid ARQ (or Chase combining) can be performed at the anchor point (say, the BSC) by combining sub-packets from various BS's—this exploits both time and space diversity.

Interference Management

The following section provides an example method to estimate channel conditions (near instantaneous or short term channel loss coefficients on the reverse link) in order for the base station to determine the maximum possible rate at which any given mobile can transmit in the reverse link. This is done with a view towards managing inter-cell and intra-cell interference.

Consider users in a given sector serviced by a BS offering various classes of traffic. Each class of service is treated differently. For example, voice may be served using power controlled channels, and delay tolerant data is best served using rate controlled shared channels. At any given instant every BS maintains a threshold $\Lambda$ for the tolerable received power. This threshold is usually set based on the characteristics of the receiver hardware at the BS, as well as coverage considerations. Typically $\Lambda$ is specified with reference to the thermal noise power $N_oW$. Within certain margins of safety, it is important to ensure that the aggregate received power at the BS does not exceed the threshold $\Lambda$. This condition may be required every instant, or on average over a fixed duration. In the latter case, $\Lambda$ is a function of time. Since the aggregate power bin consists of signals from various sources which are seen as interference by each other, we also refer to it as an "interference bin" whose size is $\Lambda$. As long as the aggregate received power at the BS is below the threshold $\Lambda$, the base station can admit new users into the system. This criterion forms the basis for the following interference management calculations.

Let there be k voice (and other power controlled) users in the system whose received powers are $S_i$ (for i=1 to k). Let $R_i$ be their transmission rates. Referring to FIG. 1, let $S_{data}$ denote the remaining portion of the interference bin which we wish to allocate to a data user. Let $S_{data}$ (R) and $(E_b/N_t)_R$ denote the power and target SNR-per-bit, respectively, that should be received at the BS to support a rate R in a bandwidth W with a desired packet or frame error rate (say 1%). The relation between $S_{data}$ (R), $(E_b/N_t)_R$ and R is simple:

$$S_{data}(R) = \left(\frac{E_b}{N_t}\right)_R \left(\frac{R}{W}\right)(N_o W + (\Lambda - S_{data}(R))) \quad (1)$$

Given a leftover power $S_{data}$, in order to determine the highest supportable rate, the BS proceeds as follows.

1. For every rate in the pre-specified (discrete) rate set, the BS computes the corresponding $S_{data}(R)$ using equation (1). These can be tabulated.

2. From this table, the BS picks the largest value of R for which the required power $S_{data}(R)$ does not exceed $S_{data}$. This ensures that the desired packet error rate condition is always met.

$N_o$ and $\Lambda$ are system dependent parameters, which are typically available only at the BS receiver. If the value of $S_{data}$ is to be used by the mobile to compute R, then $N_o$ and $\Lambda$ will also have to be broadcast periodically.

An important observation is that equation (1) is not particular to any user—it just computes the maximum data rate receivable by the BS given a certain portion of allowable received power $S_{data}$. Let the i-th mobile's signal experience a channel loss $L_i$. Then, the required transmit power $P_{data}^i(R)$ to achieve the data rate is $$P_{data}^i(R) = S_{data}(R) \cdot L_i. \qquad (2)$$

Based on the estimates of $P_{data}^i(R)$ (which in turn requires an estimate of the channel loss $L_i$) and other considerations such as fairness and QoS, interference etc., the scheduling algorithm chooses one or more users at a time and grants them permission to transmit on the uplink. In the above equations, we used "steady state," i.e. time invariant expressions for $S_{data}(R)$ and $L_i$. In a real system, the received power accrued from each power controlled channel varies in time due to power control and channel variations, which we indicate by the time variable t. As a result, the aggregate received power also varies, and so does $S_{data}(R)$. Further, the channel loss $L_i(t)$ is unknown to both the BS and the MS. In the following, we describe methods of computing $S_{data}(R,t)$, $P_{data}(R,t)$, and $L_i(t)$.

A. Computing Leftover Power $S_{data}$

Let $S_j^{PC}(t)$ denote the instantaneous received powers of the j-th power controlled (PC) uplink channel. These include voice traffic channels of users, their uplink pilot codes, and any control and signaling channels. Note that the data rates of these PC channels are known a priori. Therefore, the desired steady state value (under full loading) of the received power that ensures satisfactory error rates on each of these channels can be calculated using Equation(1); denote this steady state value by $S_j^{PC}$. Also, let $I_{oc}(t)$ denote the interference from the neighboring cells.

For each PC channel, power control attempts to ensure that $S_j^{PC}(t) = S_j^{PC}$, but usually does not succeed due to load and channel variations. Hence, it is important to estimate these carefully in order to compute a safe value for $S_{data}(R,t)$, i.e., one that ensures that the interference bin threshold $\Lambda$ is never exceeded. This can be done in different ways.

1. The received power for all PC channels is exactly what is measured at time t. Then, $$S_{data}(R, t) = \Lambda - \sum_j S_j^{PC}(t) - I_{oc}(t) \qquad (3)$$

2. The received powers for all PC channels are invariant and taken to be their steady state values. Then, $$S_{data}(R, t) = \Lambda - \sum_j S_j^{PC} - I_{oc}(t) \qquad (4)$$

This can be simplified further by assuming a steady state value $I_{oc}$ for $I_{oc}(t)$, which makes $S_{data}(R,t) = S_{data}(R)$ time invariant. This assumption is valid over long durations and hence the above rule is useful for "slow" scheduling.

3. The received power for all PC channels is always estimated to be the maximum possible. Then, $$S_{data}(R, t) = \Lambda - \sum_j \max(S_j^{PC}(t), S_j^{PC}) - I_{oc-max} \qquad (5)$$

where $I_{oc-max}$ is a prespecified maximum value of expected other cell interference. This is very conservative and results in allocation of minimum remaining power for data users. This leads to under-utilization of the interference bin, but is always safe.

4. The penalty imposed on the data power in the option 3 above can be alleviated somewhat by using the maximum value for aggregate received power from all the PC channels.

$$S_{data}(R, t) = \Lambda - \max\left(\sum_j S_j^{PC}(t), \sum_j S_j^{PC}\right) - I_{oc-max} \qquad (6)$$

There is some benefit due to the fact that the aggregate power undergoes averaging and hence does not change fast. This can make the estimation of $S_{data}(R,t)$ somewhat simpler and also less susceptible to errors.

B. Estimating the Data Channel Transmit Power $P_{data}^i(R,t)$ via Channel Loss Coefficient $L_i(t)$ We previously stated (see Equation(2)) that the BS schedules users based on knowledge of the required MS transmit powers $P_{data}^i(R)$. Estimation of the (time varying) transmit power $P_{data}^i(R,t)$ requires an estimate of the channel loss coefficient $L_i(t)$. The desired accuracy of the estimate depends on the scenario of interest. We now outline three methods that are novel and explain their applicability in different scenarios.

1. The i-th MS determines its own channel loss coefficient $L_i(t)$, by averaging the path loss coefficients observed in the forward link via the BS pilot measurements. This averages out short term channel variations and mostly reflects just the path loss and shadow fading effects; hence the estimate of $L_i(t)$ is approximately equal to $L_i$. In other words, the MS gains knowledge of the channel losses due to its geographical position, but cannot track Rayleigh fading. Subsequently the MS reports the calculated value of $L_i(t)$ periodically to the BS. This method is especially suited for slow scheduling.

2. Every MS begins with a fixed reference pilot at "fixed" power, and subsequent pilot transmissions may be power controlled by the BS. The BS keeps track of the PC loop and estimates the transmit power in the instantaneous pilot. The BS also measures the received power in the instantaneous pilot signal and estimates the instantaneous channel loss coefficient $L_i(t)$. Note that the power control commands may be received in error at the BS and hence the pilot transmit power tracking may deviate from the true value. This is especially true in SHO situations. In order to rectify this, the MS sends the reference pilot at the predetermined "fixed" power periodically. This allows for the BS to resynchronize with respect to the pilot power and thereby correct its estimate of $L_i(t)$. Local corrections in the tracking algorithm can be made if the received power at a given instant is above that corresponding to the expected transmit power. However, these local corrections have limited applicability since the higher than expected received power may be due to instantaneous changes in channel conditions and not just due to the variable user load. Further, if the fixed power reference pilot transmissions from all MSs are synchronous, the interference pattern at the BS displays some periodicity and impulsive nature, which is undesirable. In order to limit the combined interference from all users transmitting pilot of fixed power, we stagger the instants at which each user transmits the periodic reference pilot.

3. In some situations, it may be undesirable to transmit the pilot at a fixed power since this may create high interference to other users. The following can be adopted as an alternative to sending the pilot at a fixed power. The MS sends an explicit signaling message informing the BS periodically of the transmit power in the pilot signal. The BS can now resynchronize in case of error in PC loops. This method of estimating instantaneous value of $L_i(t)$ is especially suited for fast scheduling.

4. In yet another alternative method, the mobiles estimate the value of $L_i(t)$ based on the ratio of the RL transmitted pilot power and an estimate of the received pilot power at the BS. The method works as follows: Let $S_{pilot}^i(R_{pilot},t)$ and $R_{pilot}$ be the received pilot power and effective pilot channel data rate of the i-th user at the BS (note that $R_{pilot}$ is the same for all MS's). As before, $S_{data}(R,t)$ and R denote the received traffic channel power and data rate at the BS. Since both the pilot and traffic channel signals transmitted by the i-th MS are subject to identical channel conditions, the following relationships hold.

$$P_{pilot}^i(R_{pilot},t) = S_{pilot}^i(R,t) L_i(t) \quad (7)$$

$$P_{pilot}^i(R,t) = S_{data}(R,t) L_i(t) \quad (8)$$

Substituting for $L_i(t)$ from Equation (7) into Equation (8), we have $$P_{data}^i(R,t) = P_{pilot}^i(R_{pilot},t) \frac{S_{data}(R,t)}{S_{pilot}^i(R_{pilot},t)} \quad (9)$$

Now, we only need the second term on the right hand side above, which is the ratio of the data and pilot channel received powers at the BS. Rewriting Equation (1) for $S_{data}(R,t)$ and $S_{pilot}^i(R_{pilot},t)$, we have $$S_{data}(R,t) = (N_o W + \Lambda) \left[ \frac{\left(\frac{E_b}{N_t}\right)_R R}{W + \left(\frac{E_b}{N_t}\right)_R R} \right] \quad (10)$$

$$S_{pilot}^i(R,t) = (N_o W + \Lambda) \left[ \frac{\left(\frac{E_b}{N_t}\right)_{pilot} R_{pilot}}{W + \left(\frac{E_b}{N_t}\right)_{pilot} R_{pilot}} \right] \quad (11)$$

Subsituting for $S_{data}(R,t)$ and $S_{pilot}^i(R_{pilot},t)$ from Equations. (10) and (11) into Equation (9), we obtain $$P_{data}^i(R,t) = P_{pilot}^i(R_{pilot},t) \left[ \frac{\left(\frac{E_b}{N_t}\right)_R R}{\left(\frac{E_b}{N_t}\right)_{pilot} R_{pilot}} \right] \left[ \frac{W + \left(\frac{E_b}{N_t}\right)_{pilot} R_{pilot}}{W + \left(\frac{E_b}{N_t}\right)_R R} \right] \quad (12)$$

Note that R (or $S_{data}(R,t)$, $N_o$, and $\Lambda$ is known to all MS's since the BS broadcasts this information. Further, the i-th MS knows the exact pilot power $P_{pilot}^i(R_{pilot},t)$, and also the other quantities required to evaluate Equation (12). Thus, the mobile obtains an estimate of the data channel transmit power $P_{data}^i(R,t)$ via an implicit estimate of the channel loss $L_i(t)$, using the well-known pilot channel as a reference. Any power-controlled channel with a well-known data rate may be used as a reference instead of the pilot.

Some of the auxiliary issues related to the above calculations (independent of the method) include:

1. The BS has to provide some margins for $I_{oc}(t)$, and variations due to PC loops, fading etc.

2. For mobiles in soft handoff, some but not all of the BSs in the active set may schedule a MS. If the MS chooses to transmit, it picks the lowest rate among the choice of rates broadcast by the various BSs. This may lead to interference in those BS's which did not schedule the MS. But this can be managed by building margins in $I_{oc}(t)$ as discussed above.

3. All data mobiles in a given cell should be synchronized at the slot level with the PCG and across sectors/cells.

4. Scheduling one or more users at a time depends on a balance of frame fill efficiency and the necessary downlink signaling overheads.

5. Fast scheduling works best with one user at a time (to manage overheads). This not only eases the problem of interference management, but also makes the design of scheduling algorithms easier. Numerous results exist on the optimality of scheduling one user at a time. Further, every additional user further increases interference to voice users since the user-specific spreading codes used on the uplink are not orthogonal. On the other hand, the efficacy of fast scheduling also depends on the control overheads needed to enable it.

6. Sometimes it may happen that the scheduled user's received signal is not strong enough to fill the interference bin even when transmitting at maximum allowed power. In such situations, it may still be useful to schedule additional users so that the available interference bin is fully utilized. Consequently, the available received power $S_{data}(R,t)$ is appropriately split, and the value $R^i$ (or $S_{data}^i(R^i,t)$) is communicated to the i-th MS.

7. Data traffic originating at a mobile may be such that small packets need to be sent on the uplink quite often. This happens when TCP acknowledgments (ACKs) (which are typically 40 bytes long) need to be sent for data packets received on the downlink. For downlink intensive services such as web browsing, ACKs form a large fraction of uplink traffic. Hence it may be desirable to send them on a dedicated power controlled uplink code channel. Such a channel may be of sufficiently low rate, and gated off when not necessary. This is beneficial since returning the ACKs without any scheduling delay has a salutory effect on TCP and keeps the downlink pipe well utilized. The ACK packets can also be time multiplexed with other control information on existing uplink control channels such as the Reverse Fundamental Channel of cdma2000 1x. Finally, such dedicated channels can always be accounted a priori in the calculation of $S_{data}(R)$.

The invention claimed is:

1. A method for controlling uplink data communications from a first user station, comprising the steps of:

receiving a reverse link data traffic channel request comprising traffic data size information, capability information of the first user station, and information from which power available at the first user station for data traffic on the reverse link can be determined, using the received traffic data size information, the capability information of the first user station, and the information from which the power available at the first user station for data traffic on the reverse link can be determined to compute both a rate at which the first user station can transmit data and a certain time when the first user station can transmit data, the rate and the certain time being computed so as to control the level of interference while maximizing resources on the uplink;

transmitting to the first user station information that comprises an indication of when and at what rate it can transmit data; and transmitting an increase transmit power command to a plurality of other user stations in anticipation of the data transmission by the first user station.

2. The method of claim 1 wherein the traffic data size information, the capability information of the first user station, and the information from which the power available at the first user station for data traffic on the reverse link can be determined are received on the same channel.

3. The method of claim 1 wherein the traffic data size information, the capability information of the first user station, and the information from which the power available at the first user station for data traffic on the reverse link are received are received on multiple channels.

4. The method of claim 3 wherein the multiple channels are distinguished using time.

5. The method of claim 3 wherein the multiple channels are distinguished using Walsh codes.

6. The method of claim 1 wherein the information from which the power at the first user station for data traffic on the reverse link can be determined comprises reverse pilot channel transmit power information.

7. The method of claim 1 wherein the information transmitted to the first user station further comprises a transmit level to be used by the first user station for data transmission.

8. The method of claim 1 wherein the information transmitted to the first user station further comprises a data transmit start time.

9. The method of claim 1 wherein the information transmitted to the first user station further comprises a duration for which the first user station is to transmit data.

* * * * *